Patented Aug. 21, 1928.

1,681,195

UNITED STATES PATENT OFFICE.

FRIEDRICH RÜSBERG, OF MANNHEIM, AND PAUL SCHMID, OF MANNHEIM-WOHL-GELEGEN, GERMANY, ASSIGNORS TO THE FIRM RHENANIA-KUNHEIM VEREIN CHEMISCHER FABRIKEN A.-G., OF BERLIN, GERMANY.

PROCESS FOR PRODUCING ZIRCONIUM COMPOUNDS.

No Drawing. Application filed November 12, 1927, Serial No. 232,934, and in Germany December 13, 1926.

This invention relates to improvements in the production of zirconium compounds.

According to a well-known process, zirconium compounds are obtained from zirconium ores by heating the latter in mixture with quicklime and coal to temperatures of about 1400 to 1600° C. Calcium carbide or other carbides may be substituted for coal. The calcined product is extracted with hot hydrochloric acid whereupon difficultly soluble zirconyl chloride $ZrOCl_2$ is separated by cooling down the resulting solutions.

This process presents two drawbacks. The high temperatures of 1400 to 1600° C. required for fluxing the ore necessitate special heating devices which fact has hitherto impeded the carrying out of the process on an industrial scale. Furthermore the hydrochloric solutions obtained by dissolving the calcined product must be made as strong as possible in order to obtain the highest possible output of crystallized product, and therefore are liable to crystallization, even when hot, so that they cannot be filtered without chocking up the filters or filter presses.

These drawbacks are avoided by the process forming the object of the present invention which is carried out in the following manner.

We have found, that the zirconium ore may be prepared for extraction at considerably lower temperatures to be obtained easily in practice by treating the ore without any addition of coal or carbides and sintering the mixture merely consisting of zirconium ore and lime at a temperature of about 1200° C. We have found that in this case we are not at all obliged to employ quicklime. The same result is obtained by employing calcium carbonate or other earth-alkali metal carbonates. Furthermore we have ascertained that with this method of operating an addition of alkali or alkali-earth metal halogenides extraordinarily aids the sintering operation, especially when the latter is carried out in the presence of steam. In this case the sintering temperature may be reduced even below 1200° C., and the operation may be conveniently carried out in reverberatory, especially rotary furnaces. This discovery is all the more important as the present invention permits of extracting zirconium ores on a grand industrial scale and of manufacturing zirconium preparations therefrom, without the necessity of employing rather valuable chemicals or exceedingly high temperatures for the fluxing operation.

In carrying out the process in reverberatory furnaces combustibles distinguished by a high percentage of hydrogen are preferably employed, so that when burnt they furnish the steam required for the opening up operation. When employing solid fuel we preferably make use of a furnace provided with a forechamber in which the ashes of the fuel are removed. In this manner the material under treatment is prevented from being contaminated by the ashes of the fuel.

We have further found that the crystallizability of the hot hydrochloric solution of the calcined product can be considerably decreased by employing less hydrochloric acid for dissolving the product than is required for neutralizing the bases which are present. To our surprise the fact appeared that hereby the output of zirconyl chloride was not impaired. Obviously zirconyl chloride being hydrolytically split acts as a solvent upon other basic constituents of the calcined product and zirconium oxide is kept in colloidal solution.

The extracts thus obtained may be subjected to filtration without difficulty. The filtered solutions separate, even on cooling down to room temperatures, no crystals or only small quantities of them.

Further we have found that crystallization may be effected by subsequently adding hydrochloric acid to the filtered solutions, the amount of the acid being preferably calculated in such a manner that it does not exceed the difference between the theoretical amount and the amount of the hydrochloric acid added.

*Examples.*

1. 100 parts of zirconium ore containing 75% $ZrO_2$ and 15% $SiO_2$ were mixed with 10 parts of fluorspar and 140 parts of calcium carbonate. The mixture was finely ground and heated in a tubular furnace to about 1200° C. In 100 parts of the sintered product of calcination we found 40 parts of $ZrO_2$ of which 38.2 parts, i. e. 95.5% were soluble in acid.

2. 100 parts of zirconium ore of the same kind were mixed with 140 parts of calcium carbonate and after grinding the mixture was intimately mixed with 36.5 parts of a calcium chloride solution showing 36° Bé. The wet mixture was calcined in a rotary furnace at a temperature of about 1250° C. The calcined product contained 38.96% $ZrO_2$ of which 37.2%, i. e. 95.6% were soluble in acid.

When some steam was introduced into the fire gases during the calcination the sintering temperature could be decreased below 1200° C.

3. 1 kilogram of the product of sintering a mixture of zirconium and lime, containing

|  | Per cent. |
|---|---|
| CaO | 43 |
| $ZrO_2$ | 37.2 |
| $SiO_2$ | 10 |
| $Fe_2O_3 + Al_2O_3$ | 7 | requires 2.95 kilograms of commercial hydrochloric acid of 19° Bé. for dissolving the basic constituents. When employing this quantity of acid a solution is obtained which separates crystals of zirconyl chloride already when cooled down to about 70° C. However, when only 85% of the above quantity of acid, i. e. 2.4 kilograms are employed, a solution filterable without difficulty is obtained which may be cooled down to about 20° C. without crystallization taking place. After filtration 0.55 kilograms of hydrochloric acid of 19° Bé. are added whereby the zirconyl chloride is separated.

We claim:—

1. In the process of producing zirconium compounds the steps comprising mixing zirconium ores with earth aklalies and earth alkali metal halogenides in absence of carbonaceous matter, heating the mixture to sintering temperature, treating the sintered product with a quantity of hydrochloric acid insufficient to dissolve the basic constituents of the product, separating the solution, and adding hydrochloric acid thereto.

2. In the process of producing zirconium compounds the steps comprising mixing zirconium ores with earth alkalies and earth alkali metal halogenides in absence of carbonaceous matter, heating the mixture to sintering temperature in a reverberatory furnace, treating the sintered product with a quantity of hydrochloric acid insufficient to dissolve the basic constituents of the product, separating the solution, and adding hydrochloric acid thereto.

3. In the process of producing zirconium compounds the steps comprising mixing zirconium ores with earth alkalies and earth alkali metal halogenides in absence of carbonaceous matter, heating the mixture to sintering temperature in a rotary furnace, treating the sintered product with a quantity of hydrochloric acid insufficient to dissolve the basic constituents of the product, separating the solution, and adding hydrochloric acid thereto.

4. In the process of producing zirconium compounds the steps comprising mixing zirconium ores with earth alkalies and earth alkali metal halogenides in absence of carbonaceous matter, heating the mixture to sintering temperature in presence of steam, treating the sintered product with a quantity of hydrochloric acid insufficient to dissolve the basic constituents of the product, separating the solution and adding hydrochloric acid thereto.

5. In the process of producing zirconium compounds the steps comprising mixing zirconium ores with earth alkalies and earth alkali metal halogenides in absence of carbonaceous matter, heating the mixture to sintering temperature by means of a combustible rich in hydrogen, treating the sintered product with a quantity of hydrochloric acid insufficient to dissolve the basic constituents of the product, separating the solution, and adding hydrochloric acid thereto.

6. The process of producing zirconyl chloride which comprises treating zirconium ores with earth alkalies and earth alkali metal halogenides in absence of carbonaceous matter, heating the mixture to sintering temperature, treating the sintered product with a quantity of hydrochloric acid insufficient to dissolve the basic constituents of the product, separating the solution, adding hydrochloric acid thereto, and crystallizing out the zirconyl chloride formed.

In testimony whereof we affix our signatures.

FRIEDRICH RÜSBERG.
PAUL SCHMID.